Figure 1:
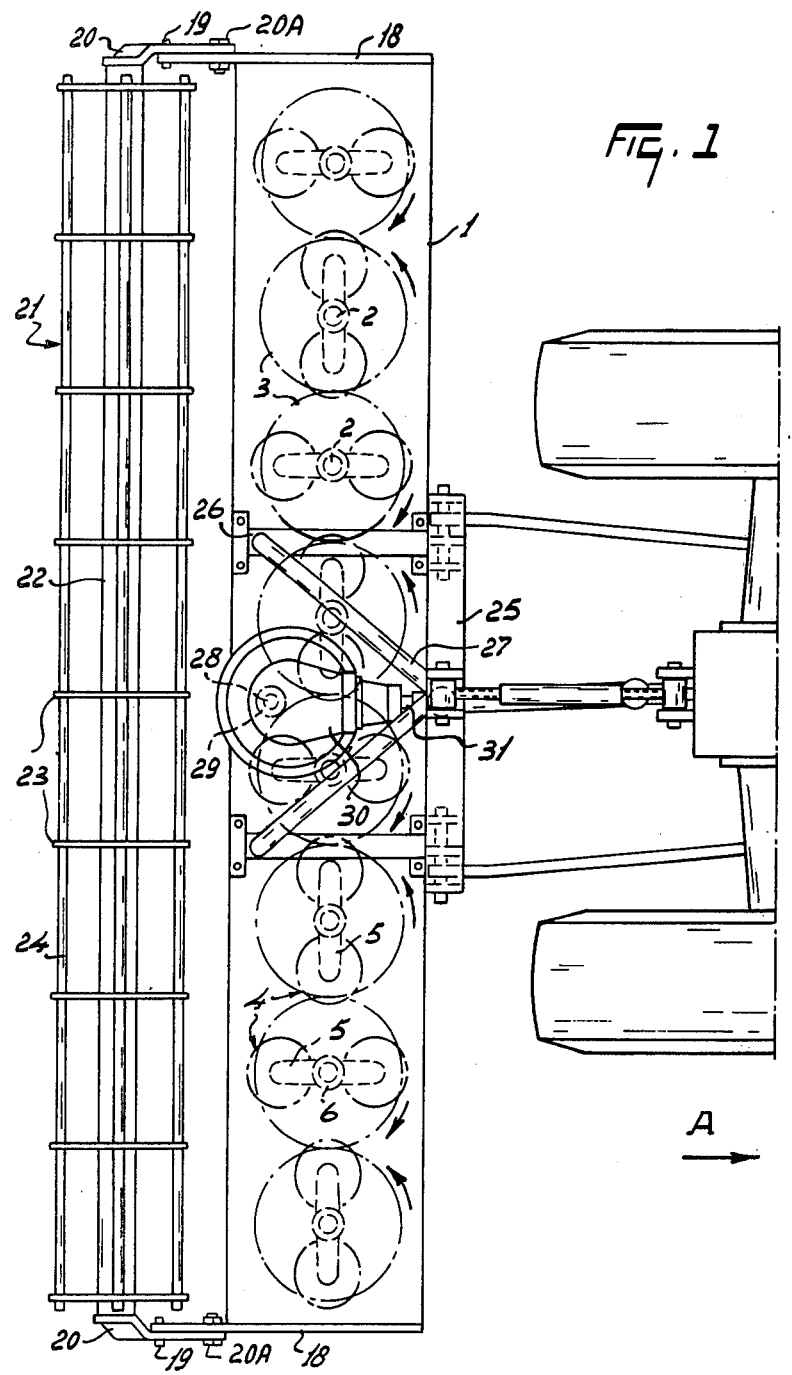

United States Patent [19]

van der Lely

[11] 4,127,177
[45] Nov. 28, 1978

[54] SOIL CULTIVATING IMPLEMENTS
[76] Inventor: Cornelis van der Lely, 7, Brüschenrain, Zug, Switzerland
[21] Appl. No.: 771,117
[22] Filed: Feb. 23, 1977
[30] Foreign Application Priority Data Feb. 23, 1976 [NL] Netherlands .................. 7601786

[51] Int. Cl.² ........................................... A01B 33/06
[52] U.S. Cl. ................................................ 172/59
[58] Field of Search ............... 172/59, 111, 526, 523, 172/522, 525, 524

[56] References Cited

U.S. PATENT DOCUMENTS

| 25,736 | 10/1859 | Hogle | 172/526 |
|---|---|---|---|
| 372,008 | 10/1887 | Ballard | 172/111 |
| 937,607 | 10/1909 | Hoover | 172/526 |
| 2,193,157 | 3/1940 | Ayo | 172/111 |
| 3,774,687 | 11/1973 | Lely | 172/59 |
| 3,897,831 | 8/1975 | Lely | 172/59 |

Primary Examiner—Richard J. Johnson
Attorney, Agent, or Firm—Mason, Mason & Albright

[57] ABSTRACT

An implement has soil working members mounted in a row that extends transverse to the direction of travel. Each member includes a horizontal support secured to an upwardly extending shaft that is driven and a soil working tool at each opposite end of the support. Each tool is freely rotatable about an upwardly extending stub shaft and has two downwardly extending tines. The two tines have respective arms of unequal lengths mounted on a hub that is journalled on the stub shaft and the tines are angled to trail with respect to the direction of driven rotation. This results in the arms being orientated in radial alignment from the soil working member's axis of rotation and the longer arm extending between that axis and the corresponding stub shaft.

13 Claims, 4 Drawing Figures

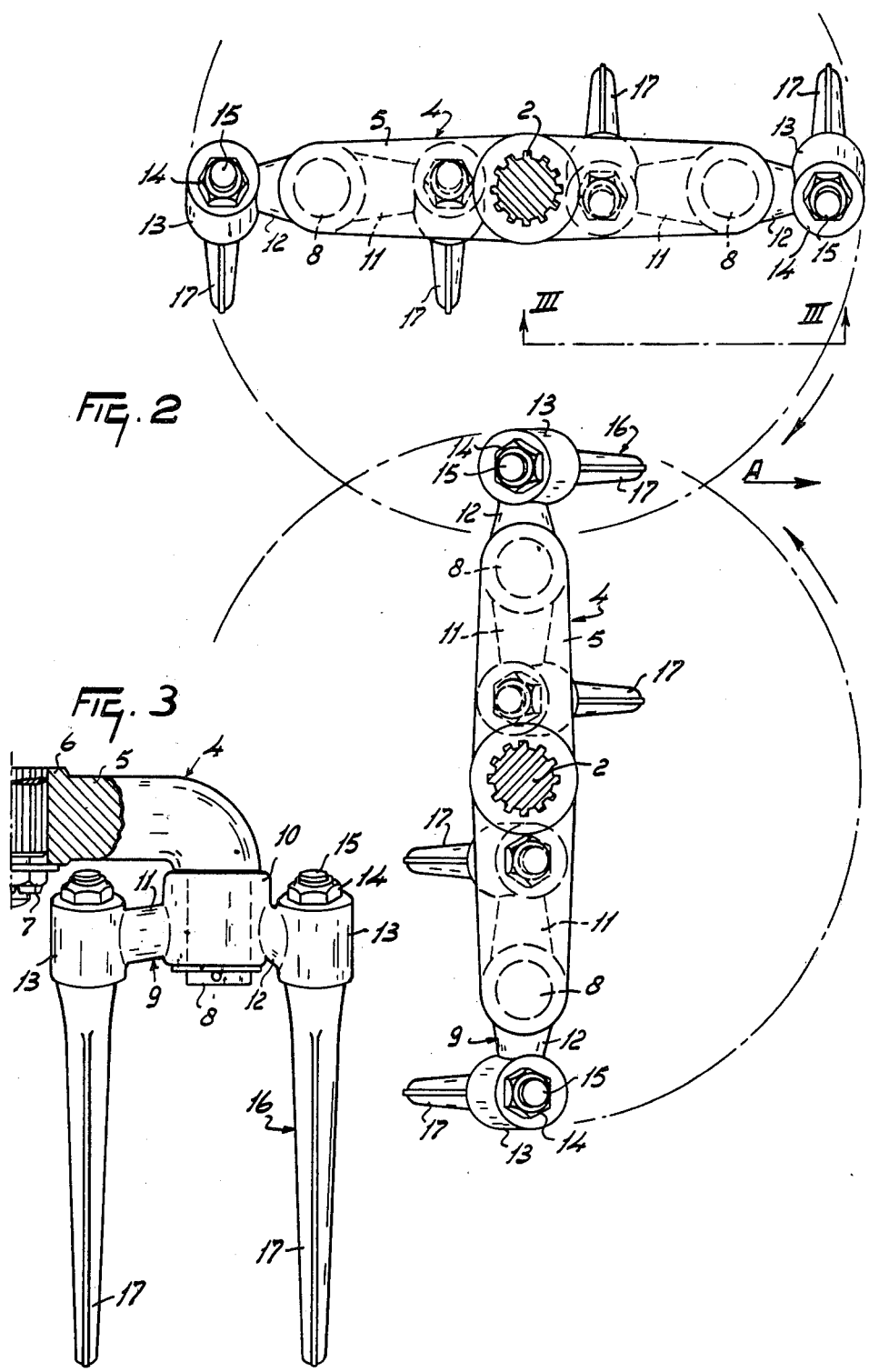

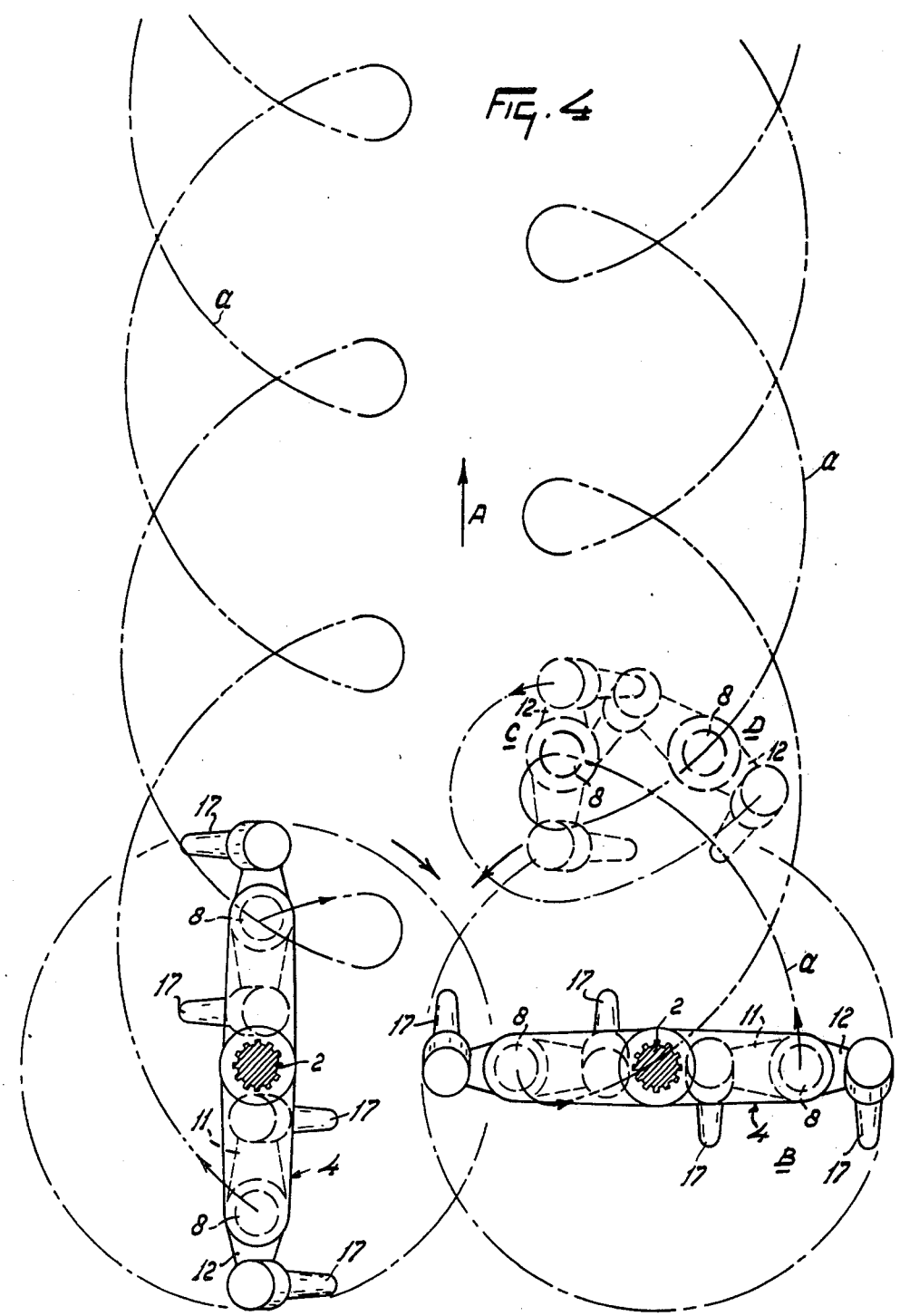

SOIL CULTIVATING IMPLEMENTS

According to one aspect of the invention, there is provided a soil cultivating implement of the kind set forth, wherein at least some of the soil working or cultivating members each comprise at least one cultivating tool that is freely rotatable about an axis spaced from the axis of rotation of the corresponding soil working or cultivating member, and wherein each such tool comprises two tines or other soil working means that are fastened in position at locations spaced by different distances from the axis of free rotation of that tool.

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agrigultural tractor, FIG. 2 is a plan view, to an enlarged scale, illustrating the construction and arrangement of two neighbouring soil working or cultivating members of the implement of FIG. 1 in greater detail, FIG. 3 is a part-sectional view as seen in the direction indicated by arrows III—III in FIG. 2, and FIG. 4 is a plan view, to a scale larger than that of FIG. 1 but smaller than that of FIGS. 2 and 3, diagrammatically illustrating the paths that are traced by the axes of rotation of rotary cultivating tools that form parts of the soil working or cultivating members of the implement during operative travel of that implement.

Referring to the drawings, the soil cultivating implement that is illustrated therein comprises a hollow box-shaped frame portion 1 that extends substantially horizontally transverse, and usually substantially perpendicular (as illustrated), to the intended direction of operative travel of the implement that is indicated in FIGS. 1, 2 and 4 of the drawings by an arrow A. A plurality (in this case, eight) of substantially vertical, or at least upwardly extending, shafts 2 are rotatably mounted in the hollow frame portion 1 in a single row that, like the frame portion 1 itself, extends transverse, and usually perpendicular, to the direction A, the axes of rotation of the eight parallel shafts 2 being spaced apart from one another by regular distances that preferably, but not essentially, have magnitudes of substantially 37.5 centimeters. Each shaft 2 is provided, inside the hollow frame portion 1, with a corresponding straight-toothed or spur-toothed pinion 3, the eight pinions 3 being so dimensioned and arranged that the teeth of each pinion are in mesh with those of its neighbour, or with those of both of its neighbours, in the row thereof. The lowermost end of each shaft 2 projects from beneath the bottom of the hollow frame portion 1 and is there provided with a corresponding rotary soil working or cultivating member that is generally indicated by the reference 4. Each member 4 comprises a carrier or support 5 having a central internally splined hub 6 whose splines co-operate with matching external splines on that portion of the corresponding shaft 2 which projects from beneath the bottom of the hollow frame portion 1. The hub 6 is retained against axial disengagement from its shaft 2 in a downward direction by a washer and a co-operating fastening nut 7 that is mounted on a short screwthreaded lowermost extremity of the shaft 2 concerned, said nut 7 and co-operating shaft extremity preferably being provided with a transverse split pin or like member arranged to ensure that the nut 7 will not work loose when the implement is in operation.

The carrier or support 5 of each soil working or cultivating member 4 comprises two arms that initially project radially in a diametrically opposite directions from the hub 6, the outer ends of said two arms being bent over downwardly through 90° to form corresponding stub shafts 8 whose longitudinal axes are parallel or substantially parallel to those of the respective hubs 6 and shafts 2, these latter axes being, it will be realised, the axes of rotation of the eight soil working cultivating members 4. Each stub shaft 8 has a corresponding cultivating tool 9 mounted thereon in a freely rotatable manner. Each such cultivating member 9 comprises a support portion in the form of a hub 10 arranged so as to be freely rotatable about the stub shaft 8 concerned and two arms 11 and 12 which, when the tool 9 is viewed lengthwise of its own axis of rotation, project in radially opposite directions from said hub 10. However, it will be seen from FIG. 3 of the drawings that said arms 11 and 12 are actually inclined outwardly and downwardly towards the ground surface by a few degrees from the hub 10. As seen in a direction parallel to the axes of rotation of the individual tools 9, the arms 11 and 12 taper outwardly away from the hubs 10 and it will be particularly noted that each arm 11 is of significantly greater length than is the corresponding arm 12, the length ratio between said arms 11 and 12 being substantially 4:3. In the particular embodiment that is being described, each arm 11 preferably has an effective length of substantially 85 millimeters while each arm 12 preferably has an effective length of substantially 63 millimeters. The ends of the arms 11 and 12 that are remote from the corresponding hubs 10 each rigidly carry a substantially cylindrical sleeve-like tine holder 13. The tine holders 13 have their longitudinal axes in non-parallel relationship with the axes of rotation of the tools 9 and the arrangement is, in fact, such that the longitudinal axes of both tine holders 13 of each tool 9 are inclined in the same direction, and at the same angle, to a plane or planes that contain the axis of rotation of the tool 9 under consideration despite the fact that said two tine holders 13 are at opposite sides of the axis of rotation of that tool 9. It is preferred that the construction and arrangement should be such that the longitudinal axis of each tine holder 13 is inclined to a plane which contains the axis of rotation of the tool 9 of which said holder 13 forms a part by an angle or not less than substantially 8°.

Each tine holder 13 receives a fastening portion 15 of a corresponding rigid soil working tine 16, a nut 14 that co-operates with a short screwthreaded uppermost part of said fastening portion 15 being employed to retain that fastening portion firmly, but releasably, in its holder 13. Each tine 16 also comprises a soil working portion 17 that projects downwardly towards (and into, during operation) the ground, the longitudinal axes of the fastening portion 15 and soil working portion 17 of each tine 16 being coincident and said soil working portion being of gently tapering configuration in a downward direction towards its lowermost free end or tip. At least part of the length of each soil working portion 17 is of substantially circular cross-section but it will be seen from the accompanying drawings that, in the embodiment which is being described, lower regions of said soil working portions 17 have non-circular cross-sections and are ribbed. Although the holders 13 will usually, as illustrated, be provided with tines, it is noted that it is within the scope of the invention to provide them with soil working means of different forms which are not necessarily tine-like. Due to the dissimilar lengths of the arms 11 and 12, the parallel tine holders 13, and thus the parallel tines 16, of each tool 9 are spaced at different distances from the axis of rotation of that tool 9 which is embodied in the corresponding stub shaft 8. FIGS. 1, 2 and 3 of the drawings all show the tools 9 in normal operative portions which are such that the longer arms 11 project from the hubs 10 directly towards the axes of rotation (embodied in the shafts 2) of the corresponding soil working or cultivating members 4.

The opposite ends of the hollow frame portion 1 are closed by substantially vertical side plates 18 that extend parallel to one another and substantially parallel to the direction A, each side plate 18 being shaped in such a way that part thereof projects rearwardly from behind the frame portion 1 relative to said direction A. The side plates 18 have a greater vertical extent at their rear ends than they do at the front thereof and each side plate 18 has a corresponding arm 20 turnably connected to it by a stub shaft 19 which is substantially horizontally perpendicular to the direction A and which is located close to the rearmost edge of the plate 18 concerned, said two stub shafts 19 being in aligned positions. The side plates 18 are formed with curved rows of holes (not visible) just behind the hollow frame portion 1 with each hole in each row at the same distance from the axis defined by the stub shafts 19. The arms 20 are formed with holes at the same distance from said axis and the holes in the arms 20 can be brought into register with chosen holes in the curved rows thereof that are formed in the side plates 18 by turning said arms 20 to appropriate angular positions about the stub shafts 19. Bolts 20A are provided for entry through the holes in the arms 20 and the chosen holes in the side plates 18 and, when said bolts 20A are tightened, the arms 20 are fixed in the chosen positions about the axis defined by the stub shafts 19 relative to the side plates 18. The ends of the arms 20 that are remote from the side plates 18 are provided with horizontally aligned bearings between which a combined soil working and rotatable supporting member in the form of a ground roller 21 of open construction is mounted. The ground roller 21 extends throughout the combined working width of the rotary soil working or cultivating members 4 and is, of course, freely rotatable relative to the arms 20 about a substantially horizontal axis that is parallel or substantially parallel to the row of said members 4. The level of the axis of rotation of the roller 21 relative to the level of the remainder of the implement is determined by the angular settings of the arms 20 relative to the side plates 18 and it will be realised that this level is a principal factor in determining the maximum depth of penetration of the tines 16 into the soil which is possible during the operation of the implement. The roller 21 has a central tubular support 22 which is provided at regular intervals along its length with a plurality, such as nine, of circular or substantially circular support plates 23, said plates 23 being in parallel relationship with each other and substantially parallel relationship with the direction A with two of them located very close to the opposite ends of the central tubular support 22. The support plates 23 are formed close to their peripheries with holes through which elongate elements 24 are entered so as to extend lengthwise of the roller 21 either in the manner which is illustrated in FIG. 1 of the drawings in which said elements are parallel to the axis of rotation of the roller or in such a way that each element 24 is wound helically to some extent around said axis of rotation.

The front of the hollow frame portion 1 with respect to the direction A is provided with a coupling member or trestle 25 that is of substantially triangular configuration when seen in either front or rear elevation, said coupling member or trestle 25 being located midway between the planes of the two side plates 18. Two strengthening supports 26 extend substantially parallel to the direction A on top of the hollow frame portion 1 and the foot of the coupling member or trestle 25 is connected to the leading ends of the two supports 26. Tie beams 27 rigidly interconnect the coupling member or trestle 25 at a location near to its apex and points on the respective strenthening supports 26 that are close to the rearmost ends of those two supports, said tie beams 27 being in downwardly and rearwardly divergent relationship with respect to the direction A from said coupling member of trestle 25 of the two supports 26. A substantially vertical or at least upwardly extending shaft 28 is rotatably mounted in the hollow frame portion 1 at a location substantially midway acorss the width thereof and close to the rear thereof with respect to the direction A, said shaft 28 carrying a toothed pinion 29 whose teeth are in driven mesh with those of one of the center pair of the row of much larger toothed pinions 3. The shaft 28 extends upwardly into a gear box 30 which is fastened to the top of the hollow frame portion 1 and a shaft and pinion transmission (not illustrated) within the gear box 30 place said shaft 28 in driven connection with a rotary input shaft 31 of said gear box 30 which shaft has a leading splined or otherwise keyed end that projects forwardly from the front of the gear box 30 in substantially the direction A. Said end of the rotary input shaft 31 is intended to be placed in driven connection with the power take-off shaft of an agricultural tractor or other operating vehicle by way of an intermediate telescopic transmission shaft, that is of a construction which is known per se, having universal joints at it opposite ends. The arrangement that has just been described can be seen in outline in FIG. 1 of the drawings.

In the use of the implement that has been described, its coupling member or trestle 25 is connected to the three-point lifting device or hitch at the rear of an agricultural tractor or other operating vehicle and the rotary input shaft 31 of its gear box 30 is placed in driven connection with the power take-off shaft of the same tractor or other operating vehicle by way of the known telescopic transmission shaft having universal joints at its opposite ends that has been mentioned above. If required, the maximum depth to which the tines 16 or other soil working means will be able to penetrate into the ground is adjusted by displacing the arms 20, in the manner that has been described, relative to the side plates 18 to change the level of the axis about which the roller 21 can freely rotate relative to the level of the remainder of the implement. As the implement move operatively over the ground in the direction A, the eight soil working or cultivating members 4 will be caused to revolve in the directions that are indicated by arrows in FIGS. 1, 2 and 4 of the drawings which directions are such that each member 4 revolves in the opposite sense to that of its neighbour, or both of its neighbour, in the row of eight members due to the disposition of the pinions 3 in the hollow frame portion 1. FIGS. 1, 2 and 3 of the drawings illustrate the previously discussed positions of the cultivating tools 9 which are such that the soil working portions 17 of their tines 16 trail rearwardly from top to bottom with respect to the directions of power-driven rotation of the corresponding members 4. Naturally, since the cultivating tools 9 are freely rotatable on the stub shafts 8, these positions are variable as a result of the progress of the tines 16 therethrough, FIG. 4 of the drawings diagrammatically illustrates the paths which are followed by the axes of rotation of the four tools 9 of two immediately neighbouring soil working or cultivating members 4 during progress of the whole implement in the direction A. Said paths are each denoted by the reference $a$ and it can be seen that one of them progresses from an initial position B to, an instant later, a subsequent position C. In the position C, the carrier or support 5 of the member 4 that is under consideration extends parallel or substantially parallel to the direction A (as seen in plan view). Each of the similar paths $a$ is of looped configuration as seen in FIG. 4 and after the elapse of a further very short period of time from occupying the position C, a further position D along the respective looped path $a$ is reached by the tool 9 under discussion. Comparing the positions C and D, it will be noted that, in the position C, the tine 16 that corresponds to the shorter arm 12 is foremost with respect to the direction A whereas, in the position D, it is located rearwardly, relative to the direction A, of the tine 16 that corresponds to the longer arm 11. In fact, FIG. 4 additionally shows, in broken lines, the path followed by the tine 16 that corresponds to the shorter arm 12 of the tool 9 which is being considered during movements of that tool 9 from position C to position D. The reason for this path being followed is the particular dissimilar distances of the two tines 16 of each tool 9 from the axis about which that tool 9 is freely rotatable. Clearly, as movement through the path $a$ of the tool 9 under consideration continues, both the member 4 carrying that tool and the tool 9 itself will regain a position substantially corresponding to the initial position B. The soil working portions 17 of the tines 16 or other soil working means remain in trailing positions with respect to the directions in which the members 4 are positively revolved during each complete rotation of each member 4 since, due to the different distances of the two tines 16 of each tool 9 from the corresponding stub shaft 8, combined with the consequential positions of those tines relative to the axes of rotation of the members 4, said tools 9 tend to maintain the positions thereof about the stub shafts 8 that are illustrated. The location of each stub shaft 8 in a position that is closer to one of the two tines 16 or other soil working means of each tool 9 than it is to the other is such as to tend to maintain the carriers or supports 5 of said tools 9 in the substantially radial positions (as seen in plan view), with respect to the axes of the corresponding shafts 2, that have been described and that are illustrated in the accompanying drawings but it will be remembered that said tools 9 are mounted in a freely rotatable manner and any one or more of them can deflect from the position that has just been mentioned when it becomes necessary for it to do so. The construction that has been described has the advantage that, when the implement is operating in substantially the manner that has been described with particular reference to FIG. 4 of the drawings, the soil working or cultivating members 4 do not displace the worked soil to any significant extent in directions that extend laterally of the direction A, if at all. This is in contradistinction to the effect that is produced by the operation of many known soil cultivating implements where considerable lateral displacement of the soil is produced, such lateral displacement usually being disadvantageous. Moreover, the trailing positions of the soil working portions 17 of the tines 16 that are substantially constantly maintained with respect to the directions of rotation of the soil working or cultivating members 4 prevent said tines 16 from digging into wet subsoil and raising the latter towards the surface, this again usually being disadvantageous.

Although certain features of the soil cultivating implement that has been described and that is illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What I claim is:

1. A soil cultivating implement comprising frame means and a plurality of soil working members mounted on said frame means, each of said members being rotatable about a corresponding upwardly extending axis defined by a shaft and a carrier support being mounted adjacent the lower end of said shaft, said support extending substantially horizontally from said shaft means and comprising two tines, said tines being held by respective arms that extend outwardly from said shaft means and said arms being of unequal length, driving means connected to rotate the corresponding soil working member, whereby said arms normally extended in radial aligned directions from the shaft.

2. An implement as claimed in claim 1, wherein each tine has a fastening portion and a lower soil working portion, the fastening portion being held adjacent the outer end of a respective arm and said arms being connected to a hub that is journalled to said shaft means, said soil working portion trailing rearwardly with respect to the normal direction of operative rotation of the corresponding soil working member.

3. A soil cultivating implement comprising frame means and a plurality of soil working members mounted on said frame means, each of said members being rotatable about a corresponding upwardly extending axis and having at least one cultivating tool that is freely rotatable about a second upwardly extending axis that is spaced laterally from said first mentioned axis, said tool including two downwardly extending tines that are secured adjacent the outer ends of corresponding arms having unequal lengths, said arms being journalled to a stub shaft that defines said second axis, each tine having an upper fastening portion and a lower soil working portion that is angled to trail rearwardly with respect to the normal direction of the corresponding soil working member.

4. An implement as claimed in claim 3, wherein the respective arms of said two tines position those tines from the axis of rotation of the respective tool by respective distances in a ratio of about 4:3.

5. An implement as claimed in claim 3, wherein, the tine which is furthest from said second axis of each freely rotatable tool, is normally located between that axis and the axis of rotation of the corresponding soil working member.

6. An implement as claimed in claim 5, wherein holders are mounted at the outer ends of said arms and said holders have longitudinal axes that are non-perpendicularly inclined in the same direction towards planes containing the axis of free rotation of the tool.

7. An implement as claimed in claim 6, wherein, the longitudinal axes of the two holders of each tool are non-perpendicularly inclined at the same angle to planes containing the axis of free rotation of said tool.

8. An implement as claimed in claim 5, wherein said arms are in alignment and positioned at opposite sides of a respective stub shaft, each working member having a substantially horizontal support with a stub shaft at opposite ends thereof, the two stub shafts of each working member being substantially parallel to said upwardly extending axis.

9. An implement as claimed in claim 8, wherein the longitudinal axes of said two stub shafts are spaced from the axis of rotation of said member by equal distances.

10. An implement as claimed in claim 3, wherein said soil working members have their axes of rotation arranged in a row and spaced apart from one another by regular distances of about 37.5 cms, the working widths of said members overlapping one another to produce a single wide strip of worked soil.

11. An implement as claimed in claim 3, wherein the lower soil working portions of said tines are in substantially coaxial relationship with upper fastening portions of those tines and the longitudinal axis of the fastening portion of each tine is coincident with the longitudinal axis of a corresponding holder positioned at the end of a respective arm.

12. A soil cultivating implement comprising frame means and a plurality of soil working members mounted on said frame means, each of said members being rotatable about a corresponding upwardly extending axis defined by a shaft and a carrier support being mounted adjacent the lower end of said shaft, said support extending substantially horizontally from said shaft and at least two tools being mounted on the support at opposite sides of that shaft, each of said tools being freely rotatable about corresponding upwardly extending shaft means and comprising two tines, said tines being held by respective arms that extend outwardly from said shaft means and said arms being of unequal length, said soil working members being mounted in a row that extends transverse to the direction of travel, each tine having an upper fastening portion and a lower soil working portion that is angled to occupy a trailing position with respect to the normal direction of rotation of the corresponding soil working member.

13. An implement as claimed in claim 12, wherein arms interconnect a rear soil working roller to said frame means, said roller having a plurality of peripheral elongated elements that extend in the general direction as a horizontal axis of rotation of said roller, adjusting means on said arms being settable to position the roller at any chosen one of a plurality of different positions relative to said soil working members.

* * * * *